(12) United States Patent
Janiaud et al.

(10) Patent No.: US 6,386,035 B2
(45) Date of Patent: May 14, 2002

(54) MONOLITHIC MINIATURE ACCELEROMETER

(75) Inventors: Denis Janiaud, Les Ulis; Olivier Le Traon, Vauhallan; Serge Muller, Ollainville, all of (FR)

(73) Assignee: Office National d'Etudes et de Recherche Aerospatiales (ONERA), Chatillon (FR)

( * ) Notice: Subject to any disclaimer, the term of this patent is extended or adjusted under 35 U.S.C. 154(b) by 0 days.

(21) Appl. No.: 09/828,925

(22) Filed: Apr. 10, 2001

Related U.S. Application Data (63) Continuation of application No. PCT/FR99/02489, filed on Oct. 13, 1999.

(30) Foreign Application Priority Data

Oct. 20, 1998 (FR) .............................. 98 13108

(51) Int. Cl.$^7$ .............................................. G01P 15/10
(52) U.S. Cl. .................. 73/514.29; 73/514.01
(58) Field of Search ........................ 73/514.29, 514.15, 73/514.18, 514.16, 514.35, 514.36, 514.38, 514.01; 310/321, 323, 338, 25

(56) References Cited

U.S. PATENT DOCUMENTS

| 4,939,935 | A |   | 7/1990 | Amand |
| 4,945,765 | A |   | 8/1990 | Roszhart |
| 5,005,413 | A | * | 4/1991 | Novack et al. .......... 73/514.29 |
| 5,456,110 | A | * | 10/1995 | Hulsing, II .............. 73/514.35 |
| 5,962,786 | A | * | 10/1999 | Le Traon et al. ........ 73/514.29 |

FOREIGN PATENT DOCUMENTS

| FR |       | 2685964 | 6/1996 |
| WO | WO 93/20413 | | 10/1993 |

* cited by examiner

Primary Examiner—Helen Kwok
(74) Attorney, Agent, or Firm—Lawrence E. Laubscher, Sr.

(57) ABSTRACT

A monolithic miniature accelerometer machined in a plate of material, comprising a fixed part, two first mobile mass parts referred to as inertial masses, two hinge blades each having one end fastened to one of the two mobile mass parts, and two resonators each having one end fastened to one of the two mobile mass parts, a third mobile mass part fastened to the other end of each of the two resonators and of each of the two hinge blades, and a flexible stem situated between the first two mobile mass parts and connecting the third mobile mass part to the fixed part.

9 Claims, 7 Drawing Sheets

MONOLITHIC MINIATURE ACCELEROMETER

REFERENCE TO RELATED APPLICATION

This application is a continuation of the PCT International Application No. PCT/FR99/02489 filed Oct. 13, 1999, which is based on the French Application No. 98-13108 filed Oct. 20, 1998.

BACKGROUND OF THE INVENTION

1. Field of the Invention

The present invention relates generally to a miniature accelerometer that can be used in aircraft, helicopter or automobile navigation, for example, or for improved power assistance of braking or active suspension of terrestrial vehicles.

The invention relates more particularly to a monolithic accelerometer including a fixed part, two mobile mass parts referred to as test weights, and two resonators, each of which has one end fastened to one of the two mobile mass parts.

2. Description of the Prior Art

The resonators constituting the responsive members of the accelerometer according to the invention are preferably flexional or torsional vibratory blades of piezoelectric material. The vibration frequencies of each of the blades are highly sensitive to the tensile or compression force that is exerted longitudinally on the blade when the inertial mass fastened to it subjected to acceleration. The extension of the blades and the compression of the other blade are converted into electrical signals that are picked up by electrodes supported by the vibratory blades and connected to two oscillator circuits, for example. A signal at a differential frequency whose variations are representative of those of the acceleration is produced at the output of the oscillator circuits. The benefit of using the difference between the two frequencies is that this reduces the effect on the two blades of spurious common mode inputs, for example temperature.

Another important aspect is the monolithic nature which enables miniature accelerometers to be fabricated at relatively low cost by chemical machining and promotes good performance, since the process of assembling together component parts generally constitutes a major limitation of non-monolithic accelerometers. The materials most frequently used to make monolithic accelerometers are quartz and silicon, which are appreciated for the excellent stability of their mechanical characteristics.

Figure 1:
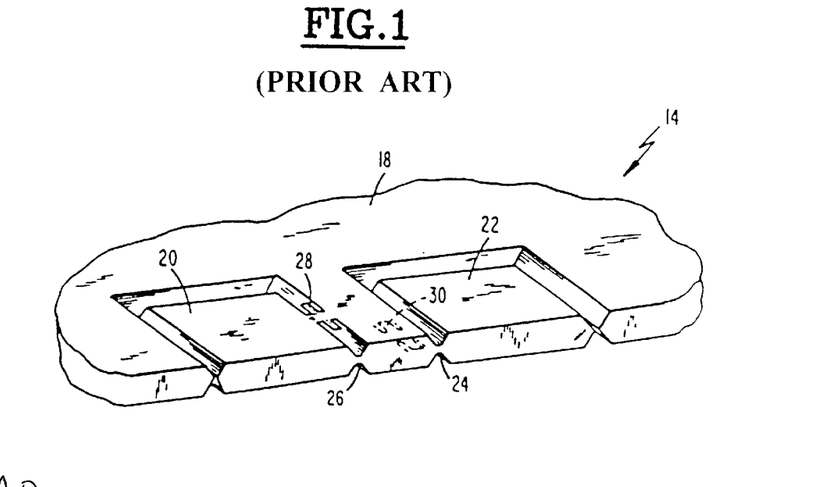

FIG. 1 shows an accelerometer of the above type disclosed in U.S. Pat. No. 4,945,765. The body of this accelerometer 14 is monolithic and is obtained by chemically machining a silicon plate. The body includes a fixed part 18, two inertial masses 20 and 22, two resonators 28 and 30 and two hinges 24 and 26. The resonators 28 and 30 vibrate in torsion and are excited electrostatically by means of a device (not shown) at whose output their resonant frequencies are delivered. The direction of sensitivity of the accelerometer is close to perpendicular to the faces of the plate. Acceleration applied in this direction causes a tension force to one resonator and a compression force to the other resonator, and the output signal of the accelerometer is the difference between the frequencies of the two resonators. The mechanical design of the accelerometer 14 nevertheless has a drawback associated with the vibration of the two resonators 28 and 30. The alternating mechanical forces generated by the vibrations of the two resonators where they are "built into" the fixed part 18 lead to dissipation of vibratory mechanical energy in the fixed part. This reduces the Q quality factor of the vibration of each of the resonators 28 and 30. This affects the precision of the measurement of the differential frequency and therefore the value of the acceleration deduced therefrom.

Figure 2:
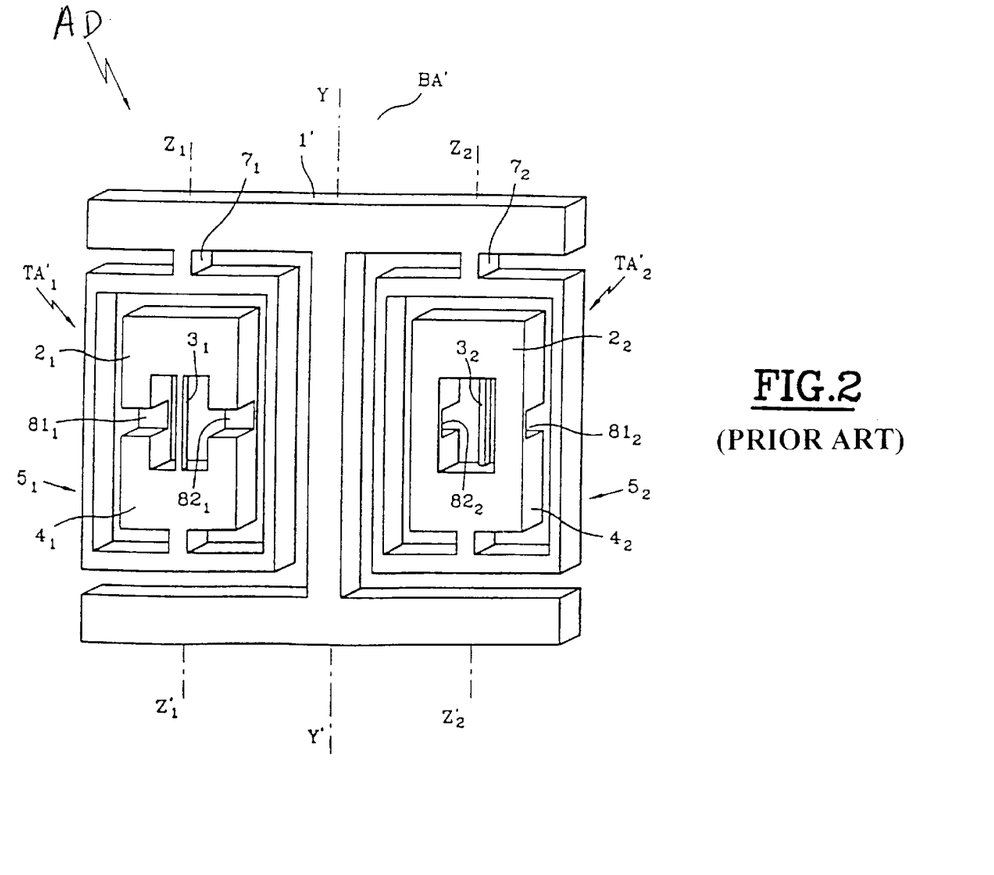

FIG. 2 shows another accelerometer disclosed in our U.S. Pat. No. 5,962,786. The body of the accelerometer AD' is monolithic and is obtained by chemically machining a quartz plate. This body includes a fixed part 1' with an I-shaped face contour, four U-shaped mobile mass parts comprising two inertial masses $2_1$ and $2_2$ and two resonators $3_1$ and $3_2$, four parallelepiped-shaped articulation blades $81_1$, $82_1$, $81_2$, $82_2$ and two flexible frames $5_1$ and $5_2$. The resonators $3_1$ and $3_2$ vibrate in flexion and are excited piezoelectrically by means of a device (not shown) at whose output their resonant frequencies are delivered. The direction of sensitivity of this accelerometer is close to perpendicular to the faces of the plate. Acceleration applied in this direction causes a tension force to one resonator and a compression force to the other resonator, the output signal of the accelerometer being the difference between the frequencies of the two resonators. This accelerometer does not have the drawback of dissipation of vibratory mechanical energy in the fixed part because the flexibility of the frames $5_1$ and $5_2$ provides a mechanical filtering effect between the resonators and the fixed part. Also, the accelerometer eliminates coupling between the two resonators (see U.S. Pat. No. 5,962,786, col. 4, lines 13–15). This accelerometer is therefore very suitable for industrial applications that require excellent precision and moderate cost. On the other hand, it has drawbacks in applications which require very low fabrication costs, in particular the field of automotive engineering. The relative complexity of the structure shown in FIG. 2 impacts on the yield of fabrication by chemical machining and limits the possibilities of miniaturization, which limits the number of structures that can be made on a quartz wafer of given dimensions. These drawbacks make it impossible to obtain a very low fabrication cost.

OBJECT OF THE INVENTION

The present invention proposes a geometrical shape which prevents leakage of vibratory mechanical energy from the resonators to the fixed part and is more suitable for miniaturization. This reduces the fabrication cost and satisfies industrial requirements for very cheap accelerometers offering high performance.

SUMMARY OF THE INVENTION

According to the invention, this monolithic miniature accelerometer comprising a fixed part, two first mobile mass parts referred to as inertial masses, two hinge blades each having one end fastened to one of the two mobile mass parts, and two resonators each having one end fastened to one of the two mobile mass parts, is characterized in that it comprises a third mobile mass part fastened to the other end of each of the two resonators and of each of the two hinge blades, and a flexible stem situated between the first two mobile mass parts and connecting the third mobile mass part to the fixed part.

Locating the stem between the two inertial masses helps to maximize the total mass of the mobile parts. The flexibility of the stem combined with the total mass of the three mobile parts provides a mechanical filter between the resonators and the fixed part of the accelerometer. The Q quality factors of the resonators is therefore not degraded much and the precision of the measurement is excellent. The simplicity and compactness of the structure achieved by locating the stem between the first two mobile mass parts is also beneficial for miniaturization and achieving a good fabrication yield. On the other hand, the presence of a mobile mass part common to the two resonators rules out eliminating mechanical coupling between them and a different solution must be found to resolve this problem thereby maintaining the precision of the accelerometer.

According to a preferred embodiment, the flexible stem is a beam extending substantially parallel to the resonators and whose height is significantly greater than the dimensions of its cross section.

To maximize the efficiency of the mechanical filter, the longitudinal axis of symmetry of the flexible stem is substantially an axis of symmetry of the body of the accelerometer.

To exploit its performance optimally, the accelerometer is preferably fixed to a base whose larger faces are not parallel, which enables the axis of sensitivity of the accelerometer to be strictly perpendicular to the plane of the support.

BRIEF DESCRIPTION OF THE DRAWINGS

Other features and advantages of the invention will become more clearly apparent after reading the following description and from the figures, in which:

FIGS. 1 and 2 are perspective views of two prior art monolithic accelerometers already commented on;

DESCRIPTION OF THE PREFERRED EMBODIMENTS

Figure 3:
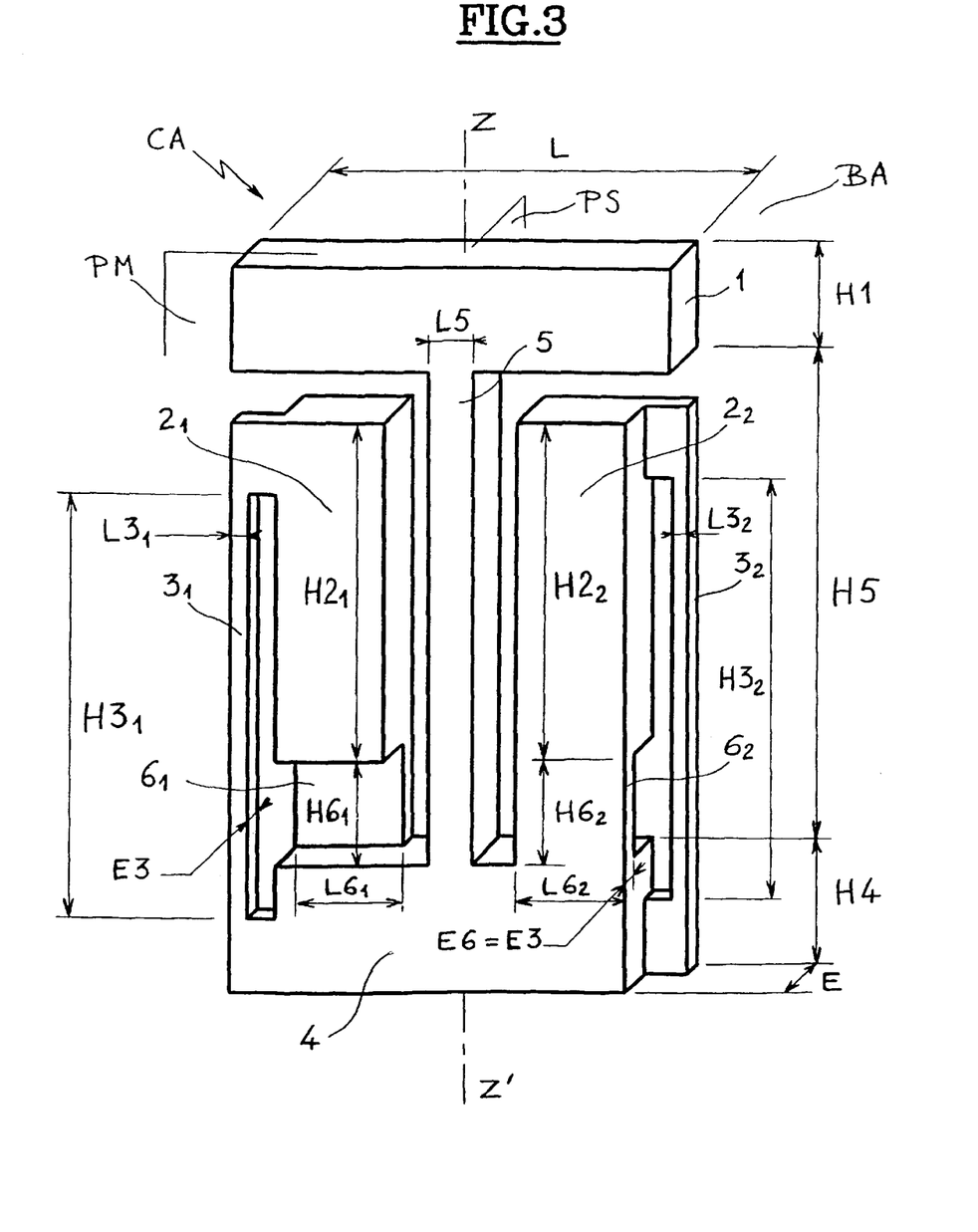
FIG. 3 is a perspective view of an accelerometer according to a first embodiment of the invention.

Referring to FIG. 3, an accelerometer CA according to the invention essentially includes a fixed part 1, two first mobile mass parts $2_1$ and $2_2$ constituting inertial masses, two resonators $3_1$ and $3_2$ constituting sensitive members, a third mobile mass part 4 and a flexible stem 5. In the embodiment shown in FIG. 3, the accelerometer CA constitutes a monolithic body machined into a single plate of a material such as quartz or silicon, of uniform thickness E, width L and height H1+H5+H4. The accelerometer CA has the general shape of a parallelepiped whose height extends along a central axis Z'Z. This axis Z'Z is contained in a mid-plane PM of the plate parallel to the faces thereof and in a plane PS perpendicular to the faces of the plate. The plane PS is a plane of symmetry of the plate and the axis Z'Z is substantially an axis of symmetry of the accelerometer.

The fixed part 1 constitutes a parallelepiped shape block of thickness E, width L and height H1 disposed at one end of the body of the accelerometer along the axis Z'Z and is adapted to be fastened to the structure of a device (not shown) by means of a base BA. The fixed part 1 is glued to the base BA, for example.

The shape of each mobile part $2_1$ or $2_2$ is substantially a parallelepiped of thickness E and of respective height $H2_1$ and $H2_2$, disposed parallel to the central axis Z'Z of the accelerometer. In the embodiment shown, the mobile parts $2_1$ and $2_2$ have substantially the same geometry, are disposed on respective opposite sides of the plane PS and each have a terminal section opposite the fixed part 1.

In the embodiment shown, each resonator $3_1$ or $3_2$ is a parallelepiped shaped blade whose respective height $H3_1$ or $H3_2$ is parallel to the axis Z'Z and whose rectangular cross section is defined by a thickness E3 in the direction of the thickness E of the accelerometer CA and a respective width $L3_1$ or $L3_2$ in the direction of the width L of the accelerometer CA. In the embodiment shown, the resonators $3_1$ and $3_2$ have substantially the same geometry. The resonators $3_1$ and $3_2$ each have one end fastened to a respective one of the mobile parts $2_1$ and $2_2$ in the vicinity of their terminal sections opposite the fixed part 1. In FIG. 3, they are situated along edges of the mobile parts $2_1$ and $2_2$ at the greatest distance from the axis Z'Z, i.e. opposite those opposite the flexible stem 5. One face of the resonator $3_1$ facing toward the outside of the body is coplanar with one of the two larger faces of the material plate. One face of the resonator $3_2$ facing toward the outside of the body is coplanar with the other larger face of the plate. In the embodiment shown, another side of the resonator $3_1$ facing toward the outside of the body is coplanar with one of the two faces of the plate parallel to the plane PS and another side of the resonator $3_2$ facing toward the outside of the body is coplanar with the other face of the plate parallel to the plane PS. Each of the resonators $3_1$ and $3_2$ has electrodes (not shown) for causing it to vibrate at its resonant frequency and adapted to be coupled to an oscillator circuit. The resonators $3_1$ and $3_2$ preferably vibrate in flexion or in torsion, because the frequencies of such vibrations are highly sensitive to tensile or compression forces applied longitudinally to the resonators when the mobile mass parts $2_1$ and $2_2$ constituting the inertial masses are subjected to acceleration. As explained in U.S. Pat. No. 5,962,786 already cited (see col. 6, lines 48–67), the resonators $3_1$ and $3_2$ can have other constitutions than that of a parallelepiped shaped blade. Similarly, different constitutions of the vibratory electrodes are possible, for example those with two or three conductive strips described in the French patent No. 2,685,964 in the name of the assignee.

In the embodiment shown in FIG. 3, the third mobile part 4 constitutes a substantially parallelepiped shaped block of thickness E and height H4 disposed at the other longitudinal end of the body of the accelerometer, perpendicular to the central axis Z'Z, and fastened to the other end of each of the resonators $3_1$ and $3_2$.

In the embodiment still shown in FIG. 3, the flexible stem 5 constitutes a parallelepiped shaped beam whose height H5 is parallel to the axis Z'Z and whose rectangular cross section is defined by a thickness E and a width L5 respectively in the direction of the thickness E and in the direction of the width L of the accelerometer CA. The width L5 of the flexible stem is therefore of the same order of magnitude as its thickness E; L5 is generally in the range from half to twice the thickness E. On the other hand, the height H5 of the flexible stem is significantly greater than its thickness E; H5 is generally in the range from five to twenty times the thickness E. The planes PM and PS are planes of symmetry of the flexible stem 5, which is therefore situated between the two first mobile mass parts $2_1$ and $2_2$. The ends of the flexible stem 5 are fastened to the fixed part 1 and to the third mobile part 4, respectively. The fixed part 1, the flexible stem 5 and the third mobile part 4 therefore form the three branches of an I-shape. The flexible stem 5 can be constituted other than in the form of the parallelepiped-shaped beam of the embodiment shown in FIG. 3. For example, the width L5 can change continuously or discontinuously along the height H5 of the flexible stem. In the case of the flexible stem 5, it must be understood that the scope of the present patent application includes such variants.

The monolithic body of the accelerometer CA also includes two parallelepiped shaped hinge blades $6_1$ and $6_2$ whose respective heights $H6_1$ and $H6_2$ are in the direction of the axis Z'Z and whose respective widths $L6_1$ and $L6_2$ are in the direction of the width L of the accelerometer CA. The plates $6_1$ and $6_2$ have a thickness E6 in the direction of the thickness E of the plate equal to the thickness E3 of the resonators $3_1$ and $3_2$. In the embodiment shown, the blades $6_1$ and $6_2$ have substantially the same geometry. The widths $L6_1$ and $L6_2$ of the blades are significantly greater than their thickness E6, which reduces the sensitivity of the accelerometer to the component of the acceleration perpendicular to the plane PS. The mechanical behavior of the accelerometer subjected to three spatial components of acceleration is described in more detail later. The widths $L6_1$ and $L6_2$ of the blades lie generally in the range from 5 to 50 times their thickness E6. The blades $6_1$ and $6_2$ each have one end fastened to a respective one of the two first mobile parts $2_1$ and $2_2$, specifically to the terminal sections of said mobile parts nearest the third mobile part 4. The other end of each of the blades $6_1$ and $6_2$ is fastened to the mobile part 4. One face of the blade $6_1$ facing toward the outside of the body of the accelerometer is coplanar with the larger face of the plate coplanar with one face of the resonator $3_2$. Similarly, one face of the blade $6_2$ facing toward the outside of the body is coplanar with the larger face of the plate coplanar with one face of the resonator $3_1$. The thickness E3 or E6 of the resonators and the blades is less than half the thickness E of the plate. The thickness E3 or E6 is generally in the range from one quarter to one twentieth of the thickness E of the plate.

As explained in U.S. Pat. No. 5,962,786 already cited (see col. 8, lines 13–30), the shapes and dimensions of the resonators and the blades enable chemical machining in a single step to fabricate the monolithic body of the accelerometer CA. The chemical machining is effected simultaneously from both faces of the plate to an etching depth equal to (E–E3).

Figure 4:
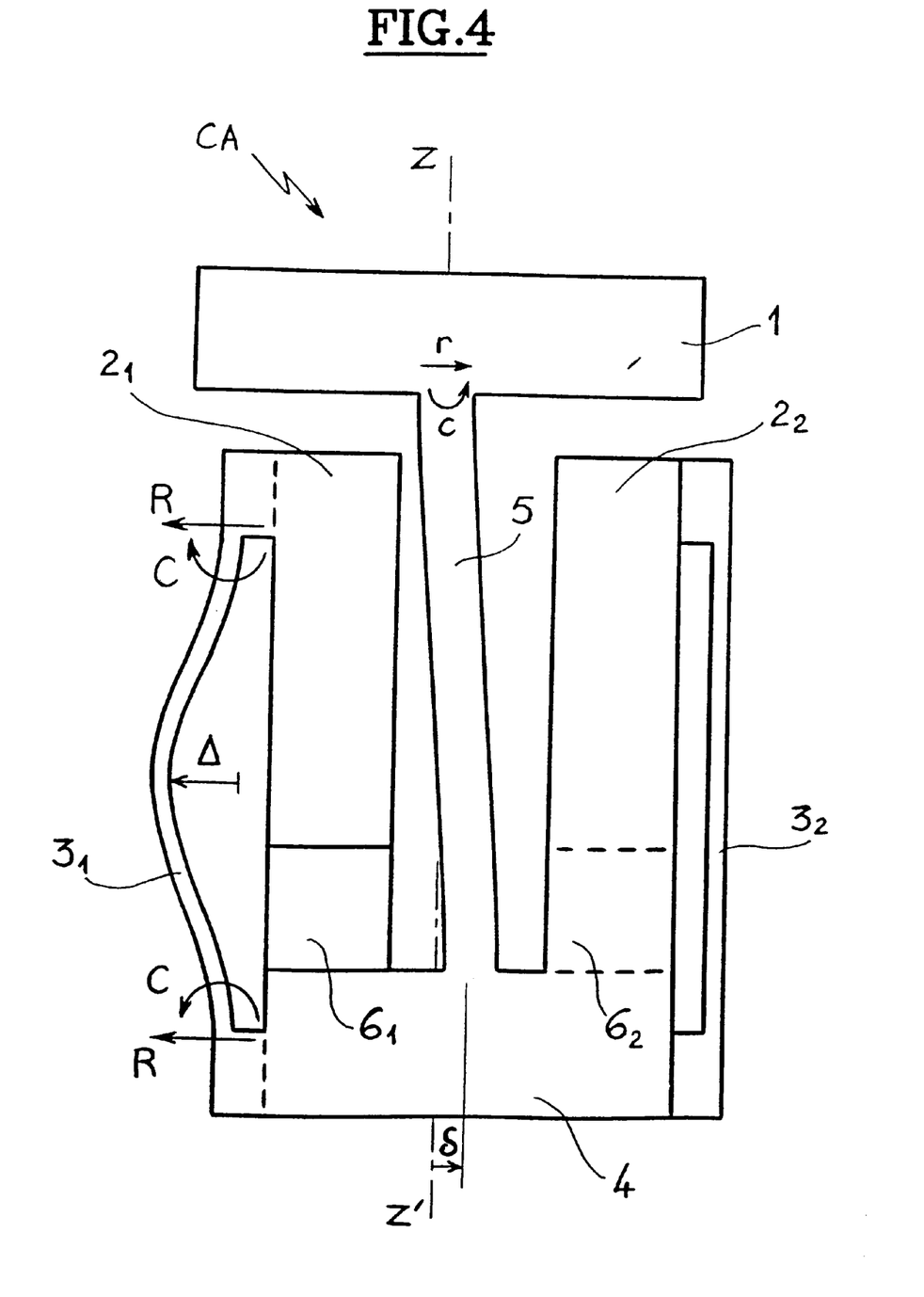
FIG. 4 is a front view of the accelerometer shown in FIG. 3 showing, in greatly exaggerated form, the deformation of the stem and one of the two resonators vibrating in flexion.

The operation of the accelerometer is now described with reference to FIG. 4, which shows the advantages of the particular disposition of the third mobile part 4 and the flexible stem 5. FIG. 4 is a front view of the accelerometer CA shown in FIG. 3 with the resonator $3_1$ vibrating in flexion in the fundamental mode, parallel to the faces of the plate. The deformations of the resonator $3_1$ and the flexible stem 5 correspond to vibration amplitudes and are exaggerated to make it easier to understand the drawing. When the resonator $3_1$ is vibrating in flexion at its resonant frequency $F_1$ it applies to each of its ends fastened to the mobile parts $2_1$ and 4 a shear force R alternating with a bending moment C. The mobile parts are therefore subjected to alternating displacements whose main component δ is a translation parallel to the faces of the plate and perpendicular to the central longitudinal axis Z'Z. This alternating displacement δ is also imposed on the mobile part $2_2$, primarily through the intermediary of the blade $6_2$. The three mobile mass parts $2_1$, $2_2$ and 4 thus constitute a "mobile assembly" whose mass is much greater than that of the vibrating resonator $3_1$. The alternating displacement δ of said mobile assembly is therefore much smaller than the vibration amplitude Δ of the resonator $3_1$. This small alternating displacement δ creates flexional vibration of low amplitude of the flexible stem 5. Said stem being flexionally flexible, the fixed part 1 receives only very small alternating forces, principally a force r and a torque c whose magnitudes are very much less respectively than those of the shear force R and the bending moment C applied by the resonator $3_1$ to each of the mobile parts $2_1$ and 4. For example, forces r and c one hundred times smaller respectively than the forces R and C can be obtained. Thus the flexibility of the stem 5 and the total mass of the three mobile parts $2_1$, $2_2$ and 4 characterize a mechanical filter between the resonator $3_1$ and the fixed part 1 of the accelerometer, said fixed part being affected very little by the vibrations of the resonator. The Q quality factor of the resonator is therefore hardly degraded at all. Remember that the alternating displacements and deformations whose amplitudes are shown in FIG. 4 constitute the main vibratory phenomena operating in the accelerometer. In reality there coexist other vibratory phenomena, of lower amplitude, such as alternating rotation of the mobile assembly consisting of the three mobile parts $2_1$, $2_2$ and 4 about the central longitudinal axis Z'Z, for example. This alternating rotation of the mobile assembly is caused by the flexional vibrations of the resonator $3_1$ and is due to the fact that the mid-plane in which these vibrations occur does not pass through the axis Z'Z, which is substantially a main axis of inertia of the mobile assembly. The alternating rotation of the mobile assembly generates alternating torsion of the flexible stem 5 about the axis Z'Z, the torsional flexibility of the stem transmitting to the fixed part 1 only a very low alternating torque about the axis Z'Z. This very low torque has only a negligible influence on the effectiveness of the mechanical filtering of the vibrations of the resonator. More generally, because of the flexibility of the stem 5, the latter effectively filters most of the alternating mechanical loads imparted by the vibrations to the resonator $3_1$. However, for the mechanical filtering to be as efficient as possible, it is preferable for the central longitudinal axis Z'Z to be substantially an axis of symmetry of the accelerometer CA, as shown in FIG. 3. In a variant where is substantially no such symmetry, the alternating mechanical loads transmitted to the fixed part 1 have magnitudes greater than those corresponding to the substantially symmetrical embodiment, but in general significantly lower than the magnitudes of the alternating forces R and C applied by the resonator $3_1$ to each of the mobile parts $2_1$ and 4.

An interpretation of the vibratory phenomena has just been given with reference to FIG. 4 in the situation in which the resonator $3_1$ vibrates in flexion at its resonant frequency $F_1$. The interpretation of the vibratory phenomena is similar in the situation in which it is the resonator $3_2$ that is vibrating in flexion at its resonant frequency $F_2$. Thus the flexibility of the stem 5 and the total mass of the three mobile parts $2_1$, $2_2$ and 4 also characterize a mechanical filter between the resonator $3_2$ and the fixed part 1 of the accelerometer.

The interpretation of the vibratory phenomena is also similar in the situation where both resonators $3_1$ and $3_2$ vibrate simultaneously at their respective resonant frequencies $F_1$ and $F_2$. The two vibrations coexist, practically independently of each other, and the mechanical filtering between the resonators and the fixed part of the accelerometer means that said fixed part is very little affected by the vibrations of the resonators and therefore that the Q quality factor of said resonators is hardly degraded at all. The precision of the measurement deduced from the differential frequency $(F_1-F_2)$ is therefore excellent and substantially as good as that of the second prior art accelerometer AD' shown in FIG. 2.

Also, the structure of the accelerometer according to the invention is simpler than that of the second prior art accelerometer and includes fewer parts likely to be affected by a chemical manufacturing machining defect, because in practice such defects have dimensions that are small compared to the dimensions of the accelerometers. In the case of the accelerometer according to the invention, the parts sensitive to a fabrication defect are essentially the resonators $3_1$ and $3_2$, whereas in the case of the second prior art accelerometer AD' shown in FIG. 2 the sensitive parts are essentially the resonators $3_1$ and $3_2$ and the flexible frames $5_1$ and $5_2$. The structure of the accelerometer according to the invention therefore achieves a higher fabrication yield than the structure of the second prior art accelerometer. Also, situating the flexible stem 5 between the two first mobile parts $2_1$ and $2_2$ makes the structure of the accelerometer according to the invention compact and therefore, given its simplicity, smaller than the structure of the second prior art accelerometer. This increased possibility of miniaturization means that a greater number of accelerometers can be made on a wafer of given dimensions. Because of these two advantages, namely the increased fabrication yield and the greater number of accelerometers machined on a wafer, the fabrication cost of the accelerometer CA according to the invention is much lower than that of the second prior art accelerometer AD'.

If the flexible stem 5 were not situated between the two first mobile parts $2_1$ and $2_2$ and if the central longitudinal axis Z'Z were to remain substantially an axis of symmetry of the accelerometer to benefit from the most efficient mechanical filtering, as explained above, the structure of said accelerometer would not be compact because the fixed part 1, the stem 5, the third mobile part 4, the two blades $6_1$ and $6_2$ and the two first mobile parts $2_1$ and $2_2$ would be staggered in that order along the height of the accelerometer, which would therefore be H1+H5+H4+H6$_1$+H2$_1$ and H1+H5+H4+H6$_2$+H2$_2$ on respective opposite sides of the plane PS. According to the invention, situating the flexible stem between the two first mobile parts limits the height of the accelerometer to H1+H5+H4.

The embodiment of the accelerometer shown in FIG. 3 also accommodates resonators $3_1$ and $3_2$ subject to flexional vibration parallel to the plane PS, i.e. transversely to the faces of the plate of material. In this case, the alternating mechanical loads applied by the resonators to the mobile parts $2_1$, $2_2$ and 4 are parallel to the plane PS, and the mobile assembly made up of said mobile parts is accordingly subjected to small alternating displacements whose main components are translations perpendicular to the faces of the plate of material and rotations about the central longitudinal axis Z'Z. These small alternating displacements in translation and in rotation of the mobile assembly create respectively flexional and torsional vibrations of the flexible stem 5. In an analogous fashion to the previous situation of resonators vibrating in flexion parallel to the faces of the plates of material, the small amplitudes of these vibrations of the stem and the flexional and torsional flexibility of said stem means that the fixed part 1 receives only very low alternating loads. The Q quality factor of each resonator is therefore hardly degraded at all.

The embodiment of the accelerometer shown in FIG. 3 also accommodates resonators $3_1$ and $3_2$ subject to torsional vibration about their respective longitudinal axes parallel to the axis Z'Z. In this case, each of the resonators $3_1$ and $3_2$ applies an alternating torque to each of the two mobile parts fastened to it, and the mobile assembly made up of the three mobile parts $2_1$, $2_2$ and 4 is therefore subjected to small alternating rotational displacements about the axis Z'Z. This results in torsional vibrations of very small amplitude of the flexible stem 5, whose flexibility means that the fixed part 1 receives only very small alternating loads. The Q quality factor of each resonator is hardly degraded at all. In an analogous fashion to resonators vibrating in flexion, it is also preferable for the central longitudinal axis Z'Z to be substantially an axis of symmetry of the accelerometer, as shown in FIG. 3, so that the torsional vibrations are mechanically filtered as efficiently as possible.

Thanks to the flexible stem 5, leakage of mechanical energy towards the fixed part 1 at the resonant frequencies of the resonators $3_1$ and $3_2$ (a few tens of kHz) are reduced as much for flexional vibrations as for torsional vibrations. However, the mechanical strength of the transducer is not degraded in the operating frequency band (from D.C. up to a few hundred Hz).

Figures 5A, 5B, 5C:
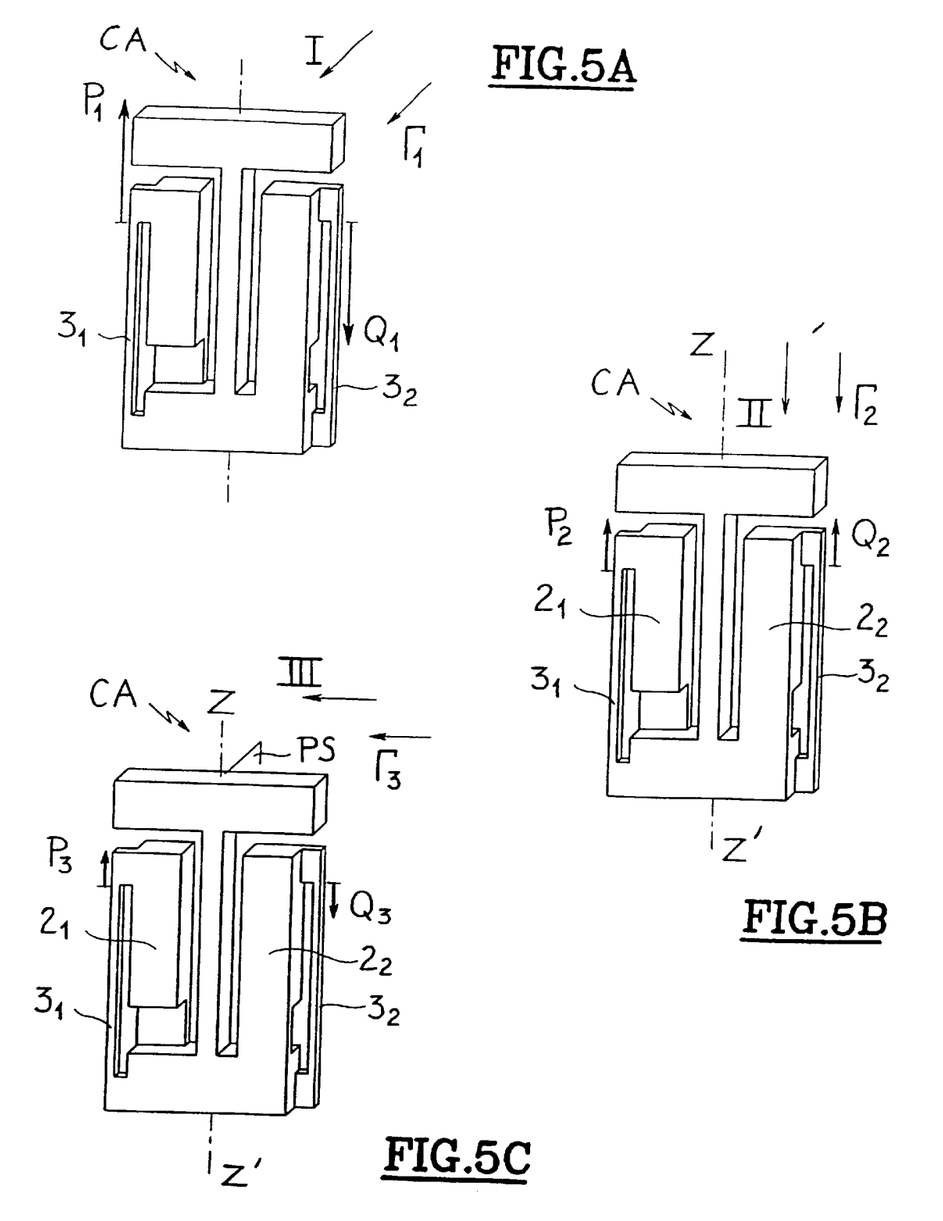
FIGS. 5A, 5B and 5C are perspective views of the accelerometer shown in FIG. 3, showing the respective mechanical forces generated by each of three spatial components of the acceleration.

The operation of the accelerometer is described next with reference to FIGS. 5A, 5B and 5C, which show the mechanical behavior of the resonators $3_1$ and $3_2$ of the accelerometer subjected to three spatial components of acceleration. FIGS. 5A, 5B and 5C are perspective views of the accelerometer CA shown in FIG. 3 and are intended to show the mechanical tensile and compression forces exerted by the mobile parts $2_1$ and $2_2$ on the resonators $3_1$ and $3_2$, respectively, when the accelerometer is subjected to each of the three spatial components of acceleration.

Referring to FIG. 5A, the acceleration $\Gamma_1$ applied along an axis I perpendicular to the faces of the plate of material applies to the resonator $3_1$ a longitudinal tensile force $P_1$ and to the resonator $3_2$ a longitudinal compression force $Q_1$.

The tensile force $P_1$ to which the resonator $3_1$ is subjected causes an increase $(\Delta F_1)_1$ in its resonant frequency $F_1$:

$$(\Delta F_1)_1 = +k_1 \Gamma_1$$

The compression force $Q_1$ to which the resonator $3_2$ is subjected causes a reduction $(\Delta F_2)_1$ of its resonant frequency $F_2$:

$$(\Delta F_2)_1 = -k'_1 \Gamma_1$$

$$(\Delta F_2)_1 = -k'_1 \Gamma_1$$

where $k_1$ and $k'_1$ are positive coefficients depending exclusively on the mechanical and geometrical characteristics of the accelerometer CA, i.e. essentially on its dimensions, the elastic coefficients and the volume mass of the material, and also on the nature of the vibrations of the resonators $3_1$ and $3_2$, for example flexion in the fundamental mode.

The differential frequency $(F_1-F_2)$ is therefore subjected to a variation $[\Delta(F_1-F_2)]_1$:

$$[\Delta(F_1-F_2)]_1 = (\Delta F_1)_1 - (\Delta F_2)_1 = k_1\Gamma_1 - (-k'_1\Gamma_1) = (k_1+k'_1)\Gamma_1$$

The variation in the differential frequency $(F_1-F_2)$ is therefore proportional to the acceleration $\Gamma_1$, and the coefficient of proportionality is the sum of the coefficients $k_1$ and $k'_1$. Note that the expression for the variation $[\Delta(F_1-F_2)]_1$ in the differential frequency is algebraic, which reflects the fact that said variation changes sign when the acceleration $\Gamma_1$ changes direction.

Referring to FIG. 5B, the acceleration $\Gamma_2$ applied along an axis II parallel to the axis Z'Z applies longitudinal tensile forces $P_2$ and $Q_2$ to the resonators $3_1$ and $3_2$, respectively.

The tension forces cause increases $(\Delta F_1)_2$ and $(\Delta F_2)_2$ in the resonant frequencies of the resonators $3_1$ and $3_2$, respectively:

$$(\Delta F_1)_2 = +k_2 \Gamma 2$$

$$(\Delta F_2)_2 = +k'_2 \Gamma_2$$

where $k_2$ and $k'_2$ are positive coefficients depending exclusively on the mechanical and geometrical characteristics of the accelerometer CA.

The differential frequency $(F_1-F_2)$ is therefore subjected to a variation $[\Delta(F_1-F_2)]_2$:

$$[\Delta(F_1-F_2)]_2 = (k_2-k'_2)\Gamma_2$$

The variation in the differential frequency $(F_1-F_2)$ is therefore proportional to the acceleration $\Gamma_2$, and the coefficient of proportionality is the difference between the coefficients $k_2$ and $k'_2$. Note that the frequency variation is algebraic.

Referring to FIG. 5C, the acceleration $\Gamma_3$ applied along an axis III perpendicular to the plane PS of the accelerometer applies to the resonator $3_1$ a longitudinal tensile force $P_3$ and to the resonator $3_2$ a longitudinal compression force $Q_3$.

The tensile force $P_3$ to which the resonator $3_1$ is subjected causes an increase $(\Delta F_1)_3$ in its resonant frequency $F_1$:

$$(\Delta F_1)_3 = +k_3 \Gamma_3$$

The compression force $Q_3$ to which the resonator $3_2$ is subjected causes a reduction $(DF_2)_3$ of its resonant frequency $F_2$:

$$(DF_2)_3 = -k'_3 G_3$$

where $k_3$ and $k'_3$ are positive coefficients depending exclusively on the mechanical and geometrical characteristics of the accelerometer CA.

The differential frequency $(F_1-F_2)$ is therefore subjected to a variation $[D(F_1-F_2)]_3$:

$$[D(F_1-F_2)]_3 = (k_3+k'_3)G_3$$

The variation in the differential frequency $(F_1-F_2)$ is therefore proportional to the acceleration $G_3$ and the coefficient of proportionality is the sum of the coefficients $k_3$ and $k'_3$. Note that the frequency variation is algebraic.

Knowing the variations in the differential frequency $(F_1-F_2)$ for the three components $G_1$, $G_2$ and $G_3$ of the acceleration, it is possible to write the differential frequency variation resulting from the application of the acceleration G with any orientation relative to the accelerometer CA, this acceleration G being defined by its three components $G_1$, $G_2$ and $G_3$ along the respective main axes I, II and III of the accelerometer CA:

$$D(F_1-F_2) = [D(F_1-F_2)]_1 + [D(F_1-F_2)]_2 + [D(F_1-F_2)]_3 = (k_1+k'_1)G_1 + (k_2-k'_2)G_2 + (k_3+k'_3)G_3$$

The coefficients $(k_1+k'_1)$, $(k_2-k'_2)$ and $(k_3+k'_3)$ can be interpreted as the three components of a vector K along the respective three main axes I, II and III, so that the variation $D(F_1-F_2)$ in the differential frequency can be written in the form of a scalar product:

$$D(F_1-F_2) = K \cdot G$$

Because the coefficients $k_1$, $k'_1$, $k_2$, $k'_2$, $k_3$ and $k'_3$ depend exclusively on the mechanical and geometrical characteristics of the accelerometer CA, the same applies to the three components $(k_1+k'_1)$, $(k_2-k'_2)$ and $(k_3+k'_3)$ of the vector K, which is therefore a vector whose orientation and intensity are specific to the accelerometer CA.

Accordingly, writing the variation $D(F_1-F_2)$ in the form of the scalar product K.G shows that said variation is zero when the acceleration G is perpendicular to the vector K and that it is maximum when the acceleration G is parallel to the vector K. In other words, the differential frequency $D(F_1-F_2)$ is sensitive only to the component of G parallel to the vector K, or the accelerometer CA is an accelerometer whose only axis of sensitivity is parallel to the vector K.

To facilitate the following description, the vector K is referred to as the acceleration measurement sensitivity vector.

When the geometry of the accelerometer CA conforms to certain conditions, the orientation of the vector K can be close to that of the axis I perpendicular to the faces of the plate. This applies in particular to the embodiment illustrated in FIG. 3, as shown hereinafter.

In the embodiment shown in FIG. 3, the mobile part $2_1$, the resonator $3_1$ and the blade $6_1$ have substantially the same geometry as the mobile part $2_2$, the resonator $3_2$ and the blade $6_2$, respectively; as a result of this, in the case of the acceleration $G_2$ shown in FIG. 5B, the longitudinal tensile forces $P_2$ and $Q_2$ are substantially equal and the respective increases $(DF_1)_2 = +k_2G_2$ and $(DF_2)_2 = +k'_2G_2$ in the resonant frequencies of the resonators $3_1$ and $3_2$ are likewise substantially equal, so that $k_2 \approx k'_2$. The component $(k_2-k'_2)$ of the vector K along the axis II parallel to the axis Z'Z is therefore substantially zero.

In the embodiment still shown in FIG. 3, the respective widths $L6_1$ and $L6_2$ of the blades $6_1$ and $6_2$ are significantly greater than their thickness $E6$; as a result of this, the stiffnesses of said blades are significantly greater in the direction of the width L of the accelerometer CA than in the direction of its thickness E, so that the longitudinal forces $P_3$ and $Q_3$ applied to the resonators in the case of an acceleration $G_3$ shown in FIG. 5C are significantly lower than the longitudinal forces $P_1$ and $Q_1$ exerted to the resonators in the case of an acceleration $G_1$ shown in FIG. 5A, for the same intensity of the accelerations $G_3$ and $G_1$. As a result of this, and still with the same intensity of the accelerations $G_3$ and $G_1$, the frequency variations $(DF_1)_3 = +k_3G_3$ and $(DF_2)_3 = -k'_3G_3$ are significantly lower than the frequency variations $(D_1)_1 = +k_1G_1$ and $(DF_2)_1 = -k'_1G_1$, respectively, so that $k_3 << k_1$ and $k'_3 << k'_1$. The component $(k_3+k'_3)$ of the vector K along the axis III perpendicular to the plane PS is therefore very much lower than the component $(k_1+k'_1)$ of the vector K along the axis I perpendicular to the faces of the plate. It is possible to obtain $(k_3+k'_3) = (k_1+k'_1)/100$, for example.

Figure 6A:
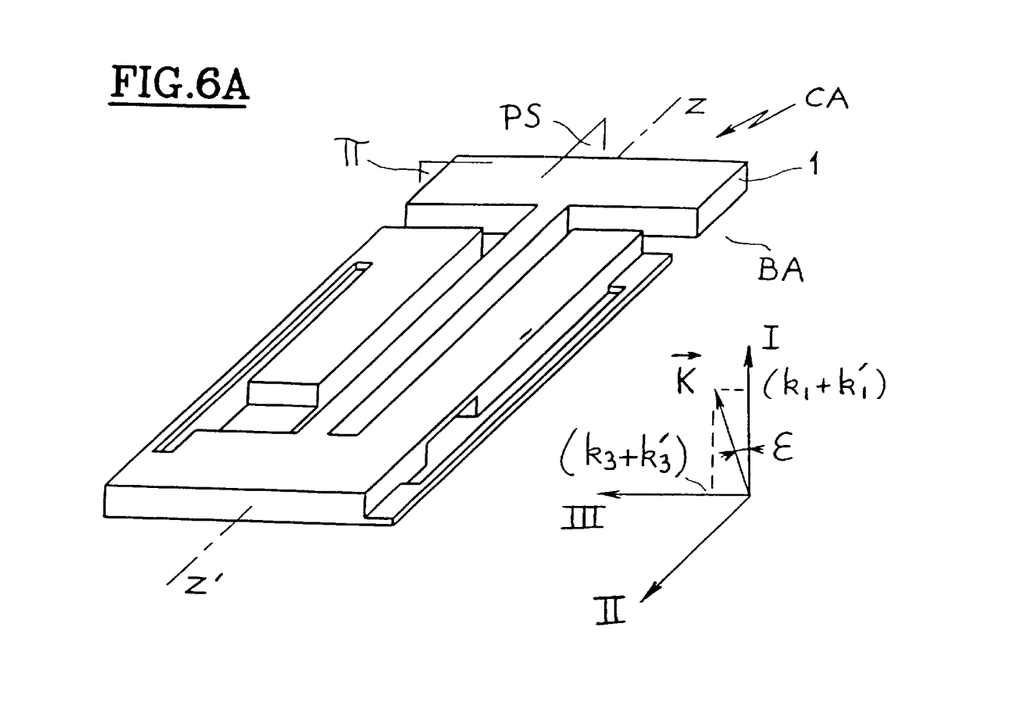
FIG. 6A is a perspective view of the accelerometer shown in FIG. 3, showing its sensitive direction for measuring acceleration.

FIG. 6A shows the orientation of the acceleration measurement sensitivity vector K relative to the three main axes of the embodiment of the accelerometer CA shown in FIG. 3. The component $(k_2-k'_2)$ along the axis II being substantially zero and the component $(k_3+k'_3)$ along the axis III being very much lower than the component $(k_1+k'_1)$ along the axis I, the orientation of the vector K is therefore close to that of the axis I. In other words, the axis of sensitivity of the accelerometer CA is approximately perpendicular to the faces of the plate of material. As shown in FIG. 6A, the vector K is contained within a plane substantially parallel to the axes I and III and has an inclination characterized by a small angle s relative to the axis I. For the example given in which $(k_3+k'_3)=(k_1+k'^1)/100$, $\epsilon$ is approximately 0.01 radian and was exaggerated in FIG. 6A to make the drawing easier to understand.

Figure 6B:
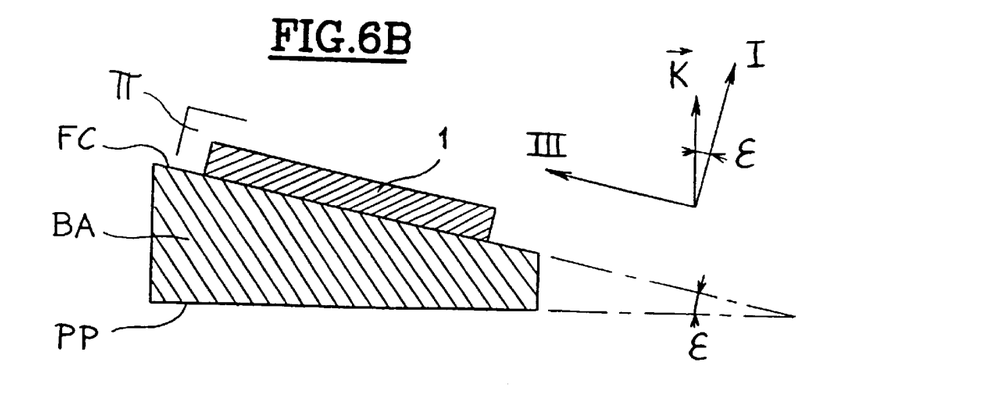
FIG. 6B is a cross section of the fixed part and the base of the accelerometer shown in FIG. 3, taken in a plane Π perpendicular to the axis Z'Z in FIG. 6A, and a cross section of a base taken in the same plane Π, to explain the manner of orienting the axis of sensitivity of the accelerometer perpendicularly to the plane of the support.

For applications in which simplicity of use is important, it is beneficial to compensate the inclination $\epsilon$. FIG. 6B shows one example of such compensation and is a view of the accelerometer CA shown in FIG. 6A in cross section taken in a plane Π orthogonal to the axis Z'Z and located in the fixed part 1. Said fixed part is fixed to a base BA, for example glued to it. In the embodiment shown, the base BA is a plate whose face FC stuck to the fixed part 1 and whose opposite face PP are not parallel to each other; the face PP is referred to as the "setting plane" of the accelerometer and is intended to be fixed to the structure of a device (not shown). The lines representing the faces FC and PP in the cross section plane Π are inclined to each other at an angle equal to the angle $\epsilon$ of inclination of the vector K relative to the axis I, so that the vector K is perpendicular to the face PP of the base BA. The accelerometer according to the invention is therefore sensitive to the component of the acceleration orthogonal to the face PP. This configuration is generally appreciated by accelerometer users because it is simple to use.

There are other means of enabling the acceleration measurement sensitivity vector K of the accelerometer according to the invention to be perpendicular to the setting plane PP of the base BA and the faces FC and PP of said base to be parallel therebetween. These means concern the accelerometer only and enable the vector K to be parallel to the axis I perpendicular to the faces of the plate, which is achieved by eliminating the component of the vector K along the axis III perpendicular to the plane PS.

First means (not shown) of eliminating said component consists of disposing one of the two resonators between the inertial mass which is fastened to it and the flexible stem, with the other resonator disposed as in the embodiment shown in FIGS. 3 and 5C. With these dispositions of the resonators an acceleration $G_3$ applied along the axis III causes longitudinal forces of the same intensity and in the same direction on both resonators. The sign and magnitude of the resulting frequency variations of the two resonators can therefore be identical and the variation in the differential frequency can therefore be zero. The component of the vector K along the axis III is therefore zero.

Second means (not shown) of eliminating said component consists of making the inertial masses U-shaped, as explained in U.S. Pat. No. 5,962,786 already cited (in which see FIG. 7C and col. 12, lines 35–40). An acceleration $G_3$ therefore applies no longitudinal force to the resonators and the resulting frequency variation of each of the resonators is zero. The corresponding variation in the differential frequency and the component of the vector K along the axis III are therefore zero.

Figure 7A:
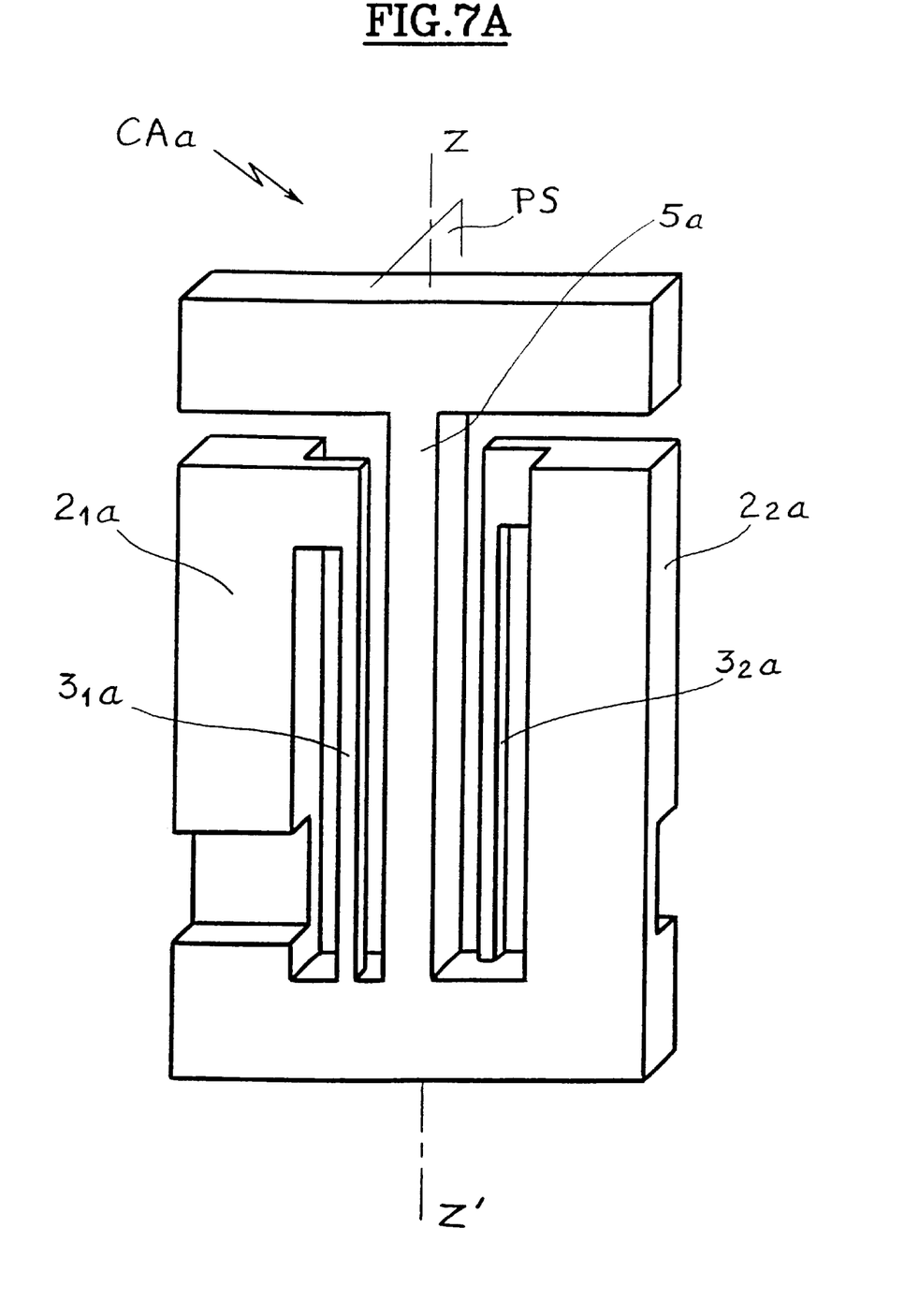
FIG. 7A is a perspective view of a variant accelerometer according to the invention.

FIG. 7A shows another embodiment of an accelerometer according to the invention. The accelerometer $CA_a$ differs from the accelerometer CA shown in FIG. 3 primarily in terms of the disposition of each of the resonators $3_{1a}$ and $3_{2a}$ between the inertial mass which is fastened to it and the flexible stem $5_a$. In the embodiment shown, one face of the inertial mass $2_{1a}$ facing toward the outside of the body is coplanar with one of the two faces of the plate parallel to the plane PS and one face of the inertial mass $2_{2a}$ facing toward the outside of the body is coplanar with the other face of the plate parallel to the plane PS. This embodiment achieves the same advantages as the embodiment shown in FIG. 3 with regard to measurement precision and cost of manufacture.

Figure 7B:
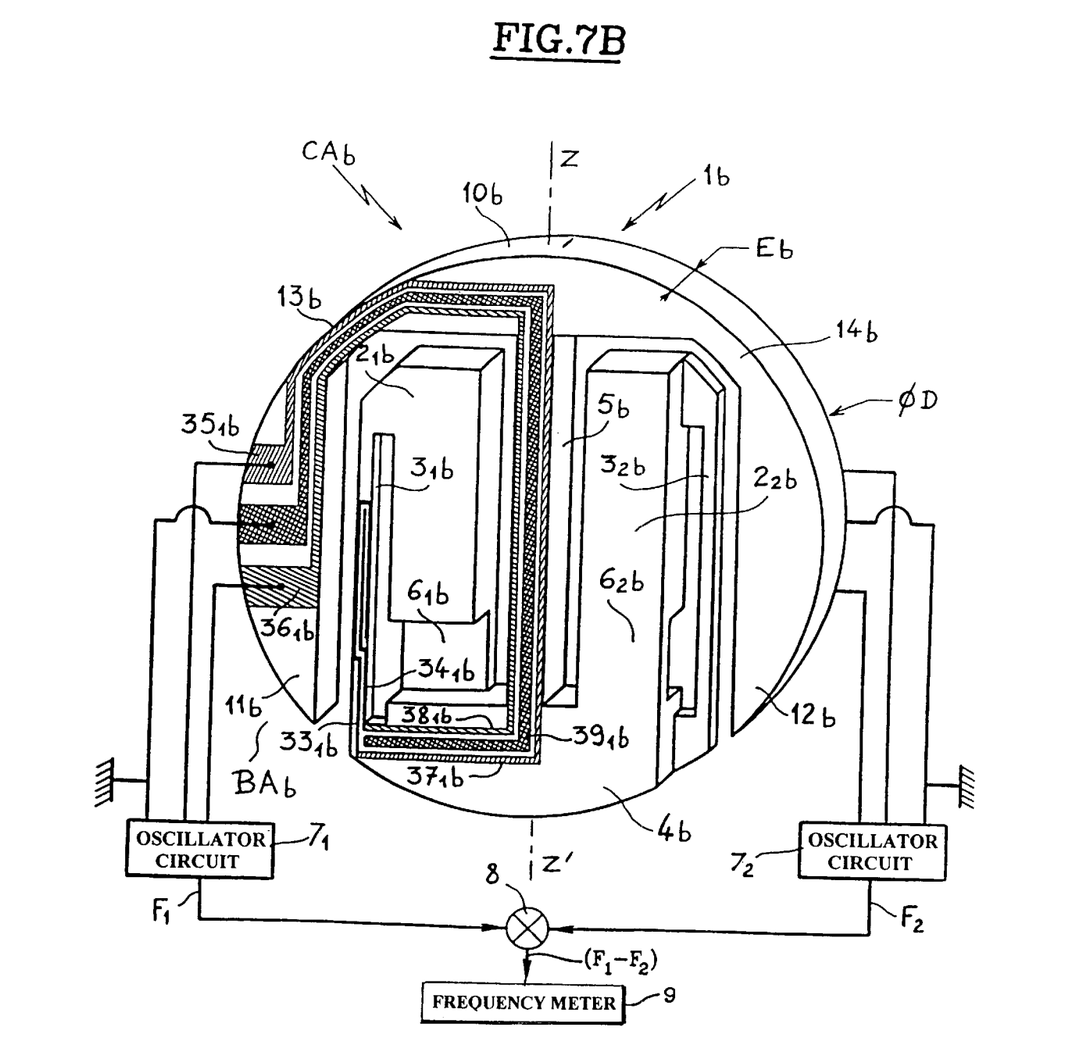
FIG. 7B is a perspective view of another variant accelerometer according to the invention, with vibrator means more appropriate to resonators vibrating flexionally and associated frequency measuring means.

FIG. 7B shows another embodiment of an accelerometer according to the invention. The monolithic body of the accelerometer $Ca_b$ is made of quartz. The means for imparting vibration to the resonators $3_{1b}$ and $3_{2b}$ in the accelerometer $CA_b$ are similar to those described in the French patent N° 2,685,964 (page 11, line 13–page 12, line 13) and therefore particularly suitable for vibrations in flexion parallel to the faces of the plate of material. The accelerometer $CA_b$ differs from the accelerometer CA shown in FIG. 3 principally in its disk-like general shape having a diameter D and a thickness $E_b$, and in the U-shape of the fixed part $1_b$. The fixed part has a base section $10_b$ in the form of discoid segment fastened to the flexible stem $5_b$, two branches $11_b$ and $12_b$ in the form of discoid segments extending substantially along the resonators $3_{1b}$ and $3_{2b}$, respectively, and two sections $13_b$ and $14_b$ in the form of ring portions joining the base section $10_b$ to the two branches $11_b$ and $12_b$, respectively. The inertial masses $2_{1b}$ and $2_{2b}$, the resonators $3_{1b}$ and $3_{2b}$, the third mobile mass part $4_b$, the flexible stem $5_b$ and the two blades $6_{1b}$ and $6_{2b}$ are therefore inside the U-shape of the fixed part $1_b$. The branches $11_b$ and $12_b$ are fixed, for example glued, to the base $Ba_b$ of a cylindrical case. With reference to the filtering previously explained and shown in FIG. 4, which consisted of ensuring that the fixed part was hardly loaded at all by the vibrations of the resonators, the effectiveness of the accelerometer $CA_b$ is substantially equivalent to that of the accelerometer CA because the flexibility of the flexible stem $5_b$ is substantially equal to the flexibility of the flexible stem 5 and the total mass of the three mobile parts $2_{1b}$, $2_{2b}$ and $4_b$ is substantially equal to the total mass of the three mobile parts $2_1$, $2_2$ and 4. With regard to miniaturization and fabrication yield, and therefore manufacturing cost, the accelerometers CA and $CA_b$ are also substantially equivalent. As shown in FIG. 7B, the means for imparting vibration to each of the resonators, for example the resonator $3_{1b}$, are in the form of two metal electrodes $33_{1b}$ and $34_{1b}$ having opposite polarities and exciting flexional vibrations of the resonator $3_{1b}$ by piezoelectric effect. The electrodes $33_{1b}$ and $34_{1b}$ are disposed on the face of the resonator $3_{1b}$ facing towards the exterior of the body of the accelerometer, and their "three track" configuration is described in the French patent No. 2,685,964 already cited. Electrical connections between the electrodes $33_{1b}$ and $34_{1b}$ and sealed feed-throughs (not shown) in the base are made in the fixed branch $11_b$ by welding to respective metal contact pads $35_{1b}$ and $36_{1b}$ of substantially rectangular shape. As shown in FIG. 7B, the metal pads $35_{1b}$ and $36_{1b}$ are connected to the respective electrodes $33_{1b}$ and $34_{1b}$ by respective metal conductive strips $37_{1b}$ and $38_{1b}$ supported by the visible face of the mobile part $4_b$, the flexible stem $5_b$, the base section $10_b$ and the section $13_b$ in the form of a ring portion. The electrodes, the conductive strips and the contact pads can be obtained simultaneously by etching a metal layer adhering to the visible face of the quartz plate using conventional photolithographic processes. This adherent metal layer may advantageously be that previously used as a protective mask for machining the monolithic body of the accelerometer. The sealed feed-throughs of the base connected to the electrodes $33_{1b}$ and $34_{1b}$ are electrically connected to the two terminals of an oscillator circuit $7_1$ at the output of which there is produced an alternating current signal having the resonant frequency F1 of the resonator $3_{1b}$. An identical disposition of electrodes, conductive strips and contact pads is provided on the resonator $3_{2b}$ and the opposite face of the mobile part $4_b$, of the flexible stem $5_b$, the base section $10_b$, the section $14_b$ in the form of a ring portion and of the fixed branch $12_b$, connected to a second oscillator circuit $7_2$ at the output of which there is produced an alternating current signal having the resonant frequency F2 of the resonator $3_{2b}$. The outputs of the two oscillator circuits $7_1$ and $7_2$ are connected to a differential frequency measuring device including a frequency subtractor circuit 8 and a frequency meter 9, the frequency ($F_1-F_2$) measured by the frequency meter 9 being representative of the acceleration to be measured. The values of the resonant frequencies $F_1$ and $F_2$ of the resonators are preferably similar but sufficiently different for the differential frequency ($F_1-F_2$) to be significantly greater than the upper limit of the bandwidth of the accelerometer, regardless of the intensity and the direction of the acceleration within the measurement range provided. This enables the frequency meter 9 to measure the differential frequency ($F_1-F_2$) under good conditions and means that measurement precision is not degraded. For example, it may be advantageous to produce an accelerometer in accordance with the invention in which the frequencies $F_1$ and $F_2$ of the resonators are respectively 55 000 Hz and 50 000 Hz in the absence of acceleration, the differential frequency variation is 25 Hz/g (where g is the acceleration due to gravity), and the measurement range runs from −100 g to +100 g; the differential frequency ($F_1-F_2$) is therefore equal to 5 000 Hz in the absence of acceleration and varies from 2 500 Hz to 7 500 Hz when the acceleration varies from −100 g to +100 g; the minimum value of 2 500 Hz of the differential frequency means that the bandwidth of the accelerometer runs from 0 to 500 Hz. The dimensions of the monolithic body of the accelerometer shown in FIG. 7B are D=6 mm and $E_b$=0.4 mm. The fact that the resonant frequencies F1 and F2 differ by not less than approximately five percent reduces sufficiently the effects of mechanical coupling between the two resonators so that the precision of measurement is not degraded. In the embodiment still shown in FIG. 7B a conductive metal strip $39_{1b}$ is situated between the conductive strips $37_{1b}$ and $38_{1b}$ on the visible face of the mobile part $4_b$, the flexible stem $5_b$, the base section $10_b$ and the section $13_b$ in the form of a ring portion, and between the contact pads $35_{1b}$ and $36_{1b}$ on the visible face of the fixed branch $11_b$. Another conductive metal strip $39_{2b}$ (not visible in FIG. 7B) is disposed identically on the opposite face of the monolithic body of the accelerometer, between the conductive strips and the contact pads connected to the second oscillator circuit $7_2$. The conductive metal strips $39_{1b}$ and $39_{2b}$ are connected to the electrical ground common to the oscillator circuits $7_1$ and $7_2$, which reduces electrical coupling between the alternating current signals produced at the outputs of the two oscillators $7_1$ and $7_2$. The differential frequency alternating current signal produced at the output of the frequency subtractor circuit 8 can therefore have an improved signal-to-noise ratio.

We Claim:

1. A monolithic miniature accelerometer machined in a plate of material, comprising:

(a) a fixed part,
   (b) two first mobile mass parts;
   (c) two hinge blades each having one end fastened to one of said two mobile mass parts, respectively;
   (d) two resonators, each having one end fastened to one of said two mobile mass parts, respectively;
   (e) a third mobile mass part fastened to the other end of each of said two resonators, respectively, and to the other end of each of said two hinge blades, respectively; and
   (f) a flexible stem situated between said first two mobile mass parts and connecting said third mobile mass part to said fixed part.

2. A monolithic miniature accelerometer according to claim 1, wherein said two resonators are situated along edges of said mobile parts remote from the edges of said mobile parts facing said flexible stem.

3. A monolithic miniature accelerometer according to claim 1, wherein said flexible stem comprises a beam extending substantially parallel to said two resonators.

4. A monolithic miniature accelerometer according to claim 3, wherein said flexible stem comprises a parallelpiped shaped beam having a thickness equal to the thickness of said plate of material and with a width in the range from half to twice the thickness of said plate of material.

5. A monolithic miniature accelerometer according to claim 4, wherein said flexible stem has a height in the range from five to twenty times the thickness of said plate of material.

6. A monolithic miniature accelerometer according to claim 1, wherein said hinge blades are parallelpiped shaped and have widths in the range from five to twenty times the thickness of said hinge blades.

7. A monolithic miniature accelerometer according to claim 1, having substantially an axis of symmetry.

8. A monolithic miniature accelerometer according to claim 1, obtained by chemically machining both faces of said plate of material simultaneously in one step to an etching depth equal to the difference between the thickness of said plate of material and the thickness of said resonators.

9. A monolithic miniature accelerometer according to claim 1, fixed to a base having a pair of larger faces of which are not parallel.

* * * * *